United States Patent
Maciocco et al.

(10) Patent No.: US 8,402,289 B2
(45) Date of Patent: Mar. 19, 2013

(54) SYSTEM AND METHOD FOR MAINTAINING CONNECTIVITY TO REMOTE APPLICATION SERVERS

(75) Inventors: Christian Maciocco, Portland, OR (US); Sameh Gobriel, Hillsboro, OR (US); Kristoffer Fleming, Chandler, AZ (US); Gideon Prat, Haifa (IL); Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/341,064

(22) Filed: Dec. 30, 2011

(65) Prior Publication Data

US 2013/0007495 A1    Jan. 3, 2013

Related U.S. Application Data

(63) Continuation of application No. 13/175,757, filed on Jul. 1, 2011, now Pat. No. 8,239,698.

(51) Int. Cl.
*H04L 29/06* (2006.01)
*G06F 1/32* (2006.01)

(52) U.S. Cl. ........ 713/300; 713/150; 713/320; 713/323; 713/324

(58) Field of Classification Search .......... 713/300, 713/320, 323, 324, 150
See application file for complete search history.

(56) References Cited

U.S. PATENT DOCUMENTS

| | | | |
|---|---|---|---|
| 6,678,728 B1 * | 1/2004 | Uppunda et al. ............. 709/222 |
| 7,483,437 B1 | 1/2009 | Mohaban | |
| 2007/0019610 A1 | 1/2007 | Backholm et al. | |
| 2007/0140193 A1 | 6/2007 | Dosa et al. | |
| 2008/0130560 A1 * | 6/2008 | Khandekar et al. ........... 370/329 |
| 2008/0162682 A1 * | 7/2008 | Ramachandran et al. .... 709/223 |
| 2009/0003319 A1 * | 1/2009 | Sood et al. ..................... 370/352 |
| 2009/0205038 A1 | 8/2009 | Kumar et al. | |
| 2010/0023759 A1 * | 1/2010 | Langer .......................... 713/156 |
| 2010/0023788 A1 * | 1/2010 | Scott et al. .................... 713/320 |
| 2010/0039971 A1 | 2/2010 | Lor et al. | |
| 2010/0058082 A1 | 3/2010 | Locker et al. | |
| 2010/0069127 A1 | 3/2010 | Fiennes | |
| 2010/0174808 A1 * | 7/2010 | Dabagh et al. ................ 709/221 |
| 2010/0322124 A1 * | 12/2010 | Luoma et al. ................. 370/311 |
| 2012/0005501 A1 * | 1/2012 | Maciocco et al. ............ 713/320 |
| 2012/0117401 A1 | 5/2012 | Gobriel et al. | |

OTHER PUBLICATIONS

Non Final Office Action Received for the U.S. Appl. No. 13/350,760, mailed on Feb. 28, 2012, 12 pages.
Notice of Allowance Received for the U.S. Appl. No. 13/350,760, mailed on Jul. 10, 2012, 5 pages.
Application and Figures from related U.S. Appl. No. 13/175,778, filed Jul. 1, 2011 (58 pgs).
International Search Report and Written Opinion from related case PCT/US2012/045125 mailed Dec. 10, 2012.
International Search Report and Written Opinion from related case PCT/US2012/045135 mailed Nov. 30, 2012.

* cited by examiner

*Primary Examiner* — Vincent Tran
(74) *Attorney, Agent, or Firm* — Grossman, Tucker, Perreault & Pfleger, PLLC

(57) ABSTRACT

A system and method for maintaining connectivity between a host system running an Always-On-Always-Connected (AOAC) application and an associated remote application server. The system further includes circuitry configured to establish a communication link between the host system and the remote application server. The circuitry is configured periodically transmit keep-alive messages to the remote application server after the host system transitions to and remains in a low-power state. The keep-alive messages are configured to maintain connectivity and presence of the AOAC application with the remote application server while the host system is in the low-power state.

20 Claims, 7 Drawing Sheets

SYSTEM AND METHOD FOR MAINTAINING CONNECTIVITY TO REMOTE APPLICATION SERVERS

CROSS-REFERENCE TO RELATED APPLICATION

This application is a continuation of co-pending U.S. patent application Ser. No. 13/175,757, filed Jul. 1, 2011, which is related to co-pending U.S. patent application Ser. No. 13/175,778, filed Jul. 1, 2011, the entire disclosure of which is incorporated herein by reference.

FIELD

The present disclosure relates to wireless and/or wired communications, and more particularly, to energy efficient communication provided while a client platform is in low power state.

BACKGROUND

To reduce power consumption (and extend battery life), portable wireless devices (such as, but not limited to, laptops, netbooks, tablet computers, and the like) may toggle between an active-power state (for example the S0 state according to the Advanced Configuration and Power Interface (ACPI) specification) and a low-power state (also known as a standby mode, sleep mode, suspend mode, or the like). When switched to the low-power state (also known as S3 mode according to the ACPI specification), power consumption is reduced by reducing and/or eliminating power to all unneeded portions of the platform and devices. In many situations it is desirable for one or more applications/services executing on the portable wireless device to maintain connectivity and presence so that the platform or end-user can always be reached.

One approach to maintain connection and presence with an application server involves periodically transitioning the platform from the standby mode to the active mode so that the platform may transmit presence data to the application server and/or receive any other data. Unfortunately, this approach requires a significant amount of energy as the entire platform is toggled between standby and active modes. Additionally, the periodic toggling between standby and active modes may have a negative impact on reliability of the standby-to-active transition. While technologies such as Wake on Wireless LAN (WoWLAN) have low power consumption, WoWLAN only maintains the data link (L2 link layer) connectivity to the local access point. As such, WoWLAN cannot maintain connectivity and presence to an application server.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an energy-efficient wireless or wired communications approach that enables a platform and applications/services (e.g., Always-On-Always-Connected (AOAC) applications) to maintain connectivity and presence to a network and remote application servers while the platform is, and stays in, a low-power state. In at least one embodiment described herein, AOAC applications/services desiring to maintain connectivity and presence to the network and remote application servers initiate the building of a list of keep-alive messages before the platform transitions into a low-power state (e.g., from an active power state) to reduce power consumption (e.g., to preserve battery life). The keep-alive messages (which may include a respective application/service proprietary protocol, sequence number, timing information, and/or application/service key or token) are periodically transmitted by a communication device (e.g., a wireless or wired Network Interface Circuitry (NIC) and/or an integrated wireless/wired controller) of the platform to the appropriate address after the platform transitions into the low-power state. As the communication device of the platform is able to issue the keep-alive messages while the platform remains in the low-power state, connectivity and presence to the network and/or remote application servers is maintained in an energy efficient manner.

As used herein, the term "active power state" refers to a platform functioning in a working or fully operational state. An example of an active power state includes the S0 state as defined by the Advanced Configuration and Power Interface (ACPI) specification. Another example includes, but is not limited to, the Full On power state. As used herein, the term "low-power state" refers to a platform functioning in a reduced power state in which power to devices that do not indicate they must remain on may be powered down and one or more central processing units (CPUs) stop executing instructions (e.g., are powered down). Examples of low-power power states include the S1, S2, S3, and/or S4 states as defined by the ACPI specification. Further examples of low-power states are also known as a standby mode, sleep mode, suspend mode, or the like.

Figure 1:
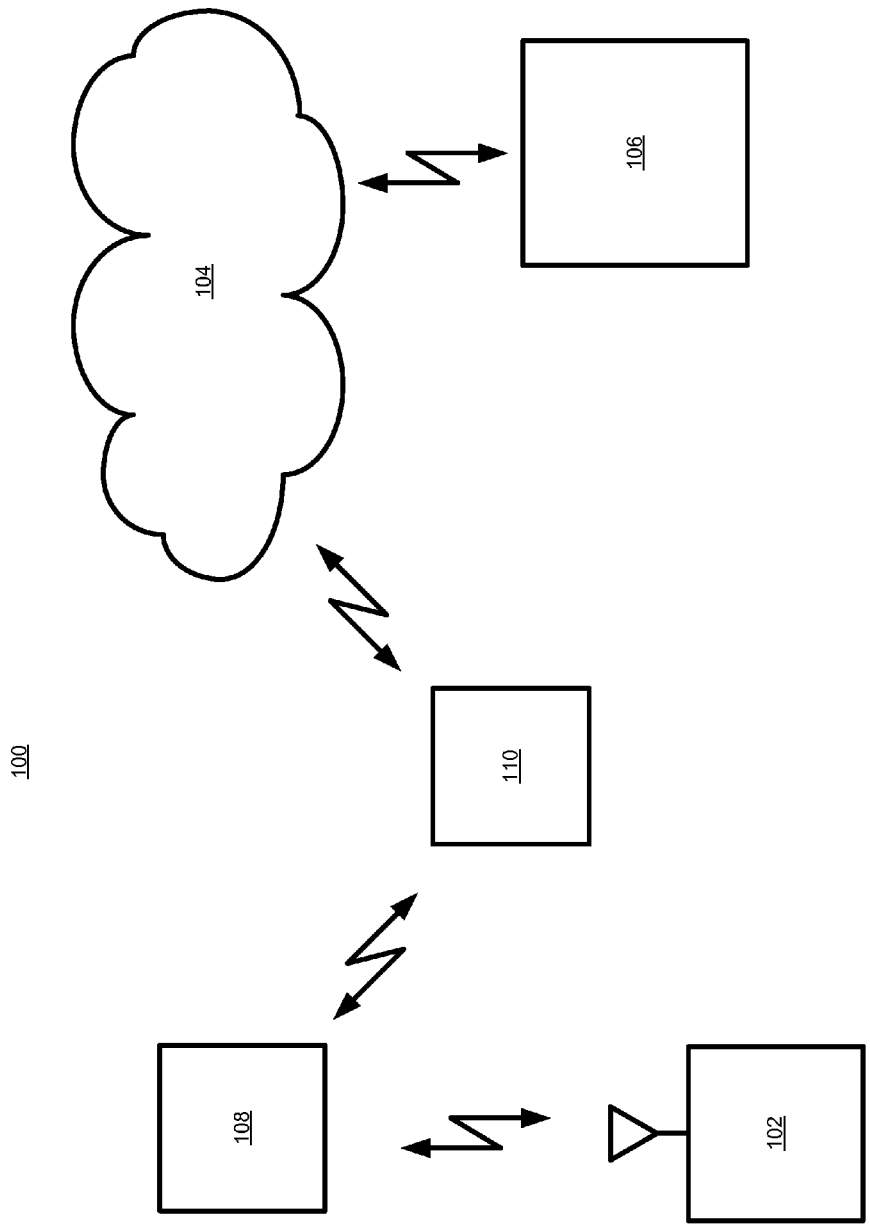
FIG. 1 illustrates one embodiment of a communication system between a client platform and a remote application server consistent with the present disclosure.

Turning now to FIG. 1, one embodiment of a communication system 100 is generally illustrated. The communication system 100 includes one or more client platforms 102 configured to establish a wireless and/or wired communication link across the network 104 with one or more remote application servers 106. The client platform 102 may include a desktop, a laptop, and/or a mobile computing device. Examples of mobile computing devices include, but are not limited to, a smart phone (such as, but not limited to, a Blackberry™ smart phone, an iPhone™ smart phone, an Android™ smart phone, and the like), a tablet computer (such as, but not limited to, an iPad™ tablet computer, PC-based tablet computers, and/or current or future tablet computers offered by Intel™ Corporation), and ultra-mobile personal computers. The client platform 102 may be configured to establish a communication link with one or more network access points/bridges 108 and/or other communication devices 110 (such as, but not limited to, Network Address Translation (NAT) devices) in the communication pathway/link between the client platform 102 and the remote application server 106. For example, the client platform 102 can use signals to communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e, 802.11 ah standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

Figure 2:
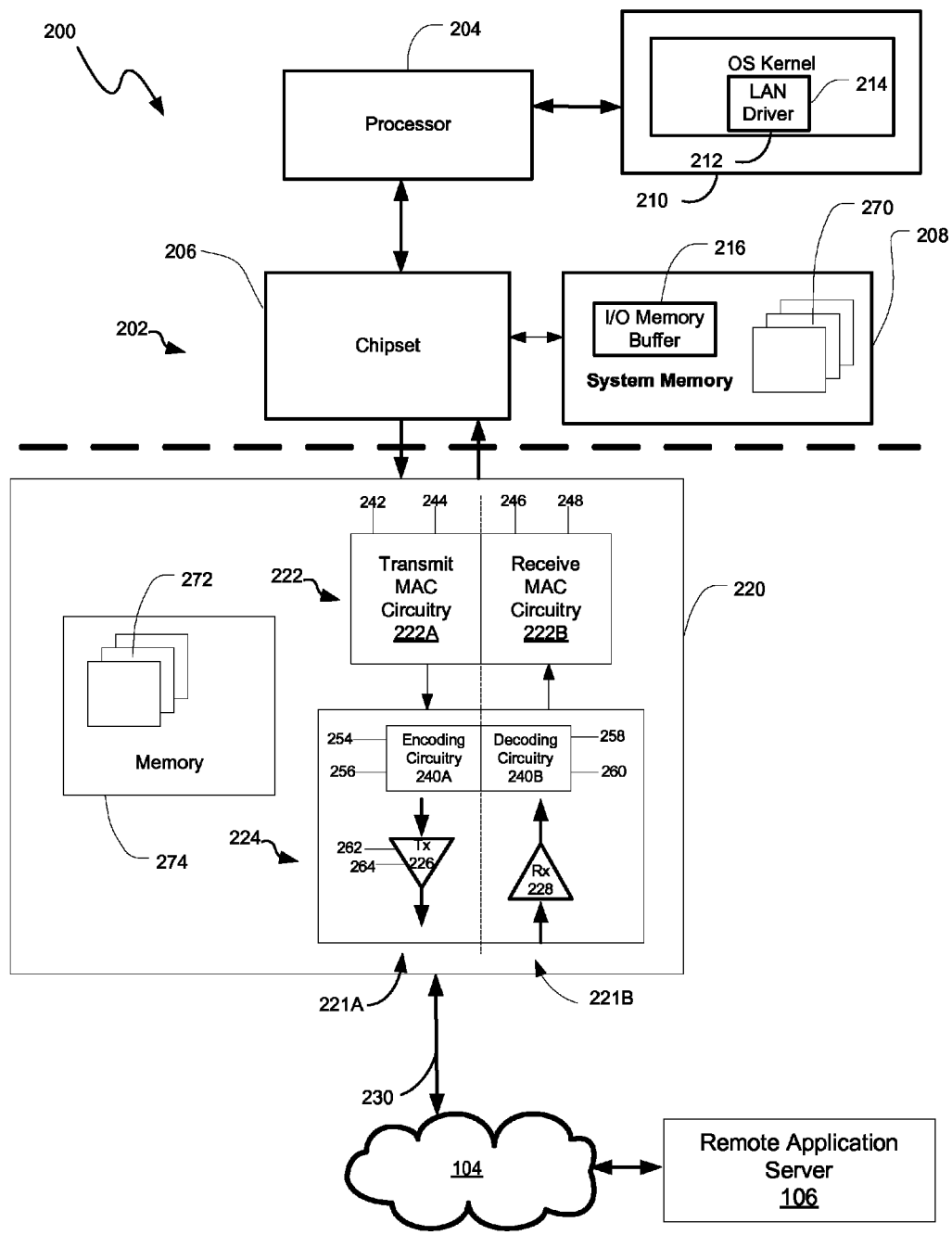
FIG. 2 illustrates one embodiment of a client platform consistent with the present disclosure.

Turning now to FIG. 2, one embodiment of the client platform 200 consistent with the present disclosure is generally illustrated. The client platform 200 includes a host system 202 and a NIC 220. The host system 202 may include a host processor 204, chipset circuitry 206 and system memory 208. The host processor 204 may include one or more processor cores and may be configured to execute system software 210. System software 210 may include, for example, operating system code 212 (e.g., OS kernel code) and wireless and/or wired driver code 214 (such as, but not limited to, a local area network (LAN)). LAN driver code 214 may be configured to control, at least in part, the operation of the NIC 220 operation, as will be described in greater detail below. System memory 208 may include I/O memory buffers 216 configured to store one or more data packets that are to be transmitted by, or received by, NIC 220. Chipset circuitry 206 may generally include "North Bridge" circuitry (not shown) to control communication between the processor 204, NIC 220 and system memory 208. Also, chipset circuitry 206 may include circuitry (not shown) to control I/O communications between the host system 202 and the NIC 220.

NIC 220 may be logically and/or physically divided into a transmit path 221A and a receive path 221B. The NIC 220 may generally include Ethernet media access control (MAC) circuitry 222 and physical interface (PHY) circuitry 224. MAC circuitry 222 may include transmit MAC circuitry 222A configured to assemble data to be transmitted into frames, or packets, that include destination and source addresses along with network control information and error detection hash values. MAC circuitry 222 may also include receive MAC circuitry 222B configured to remove data from received frames and place the data in system memory 208. PHY circuitry 224 may include encoding circuitry 240A configured to encode data packets and decoding circuitry 240B configured to decode data packets. Encoding circuitry 240A and decoding circuitry 240B may collectively be embodied as a processor (for example, a digital signal processor) configured to perform analog-to-digital and digital-to-analog conversion, encoding and decoding of data, analog parasitic cancellation (for example, cross talk cancellation), and recovery of received data. PHY circuitry 224 may also include transmit (Tx) circuitry 226 configured to transmit one or more data packets and receive (Rx) circuitry 228 configured to receive one or more data packets. Rx circuitry 228 may include phase lock loop circuitry (PLL, not shown) configured to coordinate timing of data reception. The PHY circuitry 224 may be configured to establish an Ethernet communications link 230 for transmitting and receiving data (e.g., packets) either wirelessly and/or over a media dependent interface (which may include, for example Category 6 (Cat6) Ethernet cable).

Transmit MAC circuitry 222A may include a controllable clock input 242 and a controllable power input 244. Clock input 242 may generally include a clock signal that controls the clocking of the MAC circuitry 222A. Power input 244 may generally include a power supply signal to supply power to one or more components of the MAC circuitry 222A. Similarly, Receive MAC circuitry 222B may include a controllable clock input 246 and a controllable power input 248. Clock input 246 may generally include a clock signal that controls the clocking of the MAC circuitry 222B. Power input 248 may generally include a power supply signal to supply power to one or more components of the MAC circuitry 222B. Encoding circuitry 240A may include a controllable clock input 254 and a controllable power input 256, and decoding circuitry 240B may include a controllable clock input 258 and a controllable power input 260. Transmit circuitry 226 may include a controllable clock input 262 and a controllable power input 264. In one embodiment, clocking of the transmit path 221A and receive path 221B may be independently controlled. Also, in one embodiment, the power of transmit path 221A and receive path 221B may be independently controlled.

The NIC 220 may be configured to exchange commands and data with a remote application servers 106, via one or access points/bridges (which may include a switch, bridge, router and/or other NIC which may be associated with a host system similar to host system 202, not shown in FIG. 2) and/or remote application server 106. Remote application server 106 may include any device that is configured to communicate with the NIC 220 using a wireless or wired communications protocol to maintain an AOAC application executing on client platform 200.

Although other power states are also possible, the client platform 200 is configured to operate in at least an active power state mode and a low-power state. In the active-power state, the host system 202 and the NIC 220 are generally fully functional. When the client platform 200 is operating in the low-power state, power may generally be turned off to the host system 202, and just the NIC 220 may remain functional.

Prior to switching from a first power state (e.g., the active power state or an intermediary or secondary-power state between the active power state and the low-power state as described herein) to the low-power state, the client platform 200 is configured to initiate the building of a list or set of keep-alive messages 272 for one or more AOAC applications/services 270 (e.g., applications 270 stored in memory 208) executing on the host system 202 that desire to maintain connectivity and presence to the network and application servers. For example, the AOAC applications/services 270 may initiate the building of the keep-alive messages 272 immediately prior to the client platform 200 transitioning to the low-power state, for example, upon activation of a function key or any other means such as, but not limited to, a predefined timeout period. The keep-alive messages 272 are configured to maintain connectivity and presence with the remote application servers. For example, the keep-alive messages 272 may be configured to maintain the L2 connectivity (for example, to support WoWLAN). The offloaded protocols may also be configured to maintain the platform L3 (IP) address (e.g., Address Resolution Protocol (ARP), Dynamic Host Configuration Protocol (DHCP) leases, and Internet Control Message Protocol (ICMP)).

The specific format of each of the keep-alive messages 272 will therefore depend on the specific AOAC application as well as the transmission protocols used to communicate between the client platform 200 and the remote application servers. For example, the keep-alive messages 272 may be generated based on a respective AOAC application/service proprietary protocol and may include appropriate sequencing information and timing (if required) and may be secured with the application/service key/tokens (if required).

The set of keep-alive messages 272 (or at least a portion thereof) may be stored in memory 274. Memory 274 may be located anywhere on the client platform 200 that is accessible by the NIC 220 while the client platform 200 is (and remains) in the low-power state. For example, memory 274 may be part of the NIC 220; however, this is only an example and the memory 274 storing the set of keep-alive messages 272 may be located anywhere in the client platform 200.

Once the client platform 200 transitions into the low-power state, the NIC 220 may be configured to periodically transmit at least one data packet to the remote application server 106 containing a keep-alive message 272. For example, according to one embodiment, the transmit MAC circuitry 222A is configured to receive an AOAC command from a device driver operating on the host system 202. In response to the AOAC command, the transmit MAC circuitry 222A and at least the Tx circuitry 226 are configured to periodically transmit data packets including the keep-alive messages 272 to the remote application server 106. The keep-alive message 272 may be periodically transmitted based on one or more clock signals/inputs 242, 246, 254, 258, and/or 262 associated with the NIC 220. The frequency in which the keep-alive messages 272 may be transmitted by the NIC 220 may be the same or different for each of a plurality of AOAC applications 270. Additionally, the frequency in which the NIC 220 transmits the keep-alive messages 270 may be constant or may change over time.

For example, when there are multiple AOAC applications 270 on the client platform 200, the client platform 200 (e.g., but not limited to, the NIC 220) may determine the minimum time or frequency ($T_{app}$) required for each AOAC application 270 in order to maintain connectivity and presence with the remote servers. The client platform 200 may then compare each of the minimum times $T_{app}$ to determine the smallest $T_{app}$ of all of the AOAC application 270 (i.e., $T_{min}$). The NIC 220 may then transmit the keep-alive messages 272 for all of the AOAC applications 270 based on $T_{min}$. Transmitting the keep-alive messages 272 based on $T_{min}$ for all of the AOAC applications 270 may further reduce power consumption of the client platform 200 while in the low-power state. In particular, the NIC 220 generally consumes more power while transmitting packets than when not transmitting. As such, transmitting the keep-alive messages 272 based on $T_{min}$ for all of the AOAC applications 270 may further reduce power consumption of the client platform 200 by allowing the NIC 220 to transmit multiple keep-alive messages 272 during a single time period and therefore minimizing the amount of time that the NIC 220 spends transmitting packets.

When all of the keep-alive messages 272 in the memory 274 have been transmitted by the NIC 220, the NIC 220 maybe configured to transition the client platform 200 from the low-power state to the active power state (or an intermediary power state between the low-power state and the active-power state) to generate additional keep-alive messages 272 in memory 274. Once the memory 274 has been replenished with additional keep-alive messages 272, the client platform 200 may transition back to the low-power state and the NIC 220 may resume periodically transmitting the keep-alive messages 272 as described herein.

According to another embodiment, the client platform 200 may reduce the storage required to maintain connectivity and presence while client platform 200 is in the low-power state. In particular, the client platform 200 may be configured to generate a general keep-alive message with a list of security tokens for a predefined period of time. The general keep-alive messages and the list of security tokens may then be transferred to the NIC 220 before the client platform 200 transitions in the low-power state. Additionally, information about each keep-alive message (such as the minimum required periodicity to maintain presence/connectivity, the destination address for the keep-alive message, etc.) may also be transferred to the NIC 220. Upon transitioning to the low-power state, the NIC 220 may recover the general keep-alive messages and the list of security tokens, and update the pre-built general keep-alive messages with the security token from the list and sequencing information (along with the destination address). The NIC 220 may then transmit the keep-alive message 272 at the appropriate time intervals to maintain the application/service presence to the network in a secure fashion as to preserve itself against various attacks. Accordingly, the amount of storage required may be reduced since the general keep-alive message and the list of security tokens is generally much smaller than the list of completely pre-built keep-alive messages 272. By way of example, storing ten fully pre-build keep-alive messages of 200 bytes each would require 2000 bytes of storage while using a general keep-alive message of 200 bytes and a list of security token for each message to be generated would require less than 400 bytes for example.

The client platform 200 (e.g., the NIC 220) may also be configured to support more extensive wake patterns than the one defined for WoWLAN. For example, the NIC 220 may be configured to wake up all or a portion of the client platform 200 upon receiving an incoming internet packet, for example, from specific internet based applications such as applications/services executing on one or more remote application servers. Examples of wake patterns may include, but are not limited to, a TCP (Transport Control Protocol) SYN message, an HTTP or HTTPS message, or any application specific message.

The NIC 220 may also be configured to optionally receive at least one data packet from the remote application servers 106. In one embodiment, to transition into the low-power state from the active data transmission power state, the NIC 220 may be configured to control the clock input 242, 254 and/or 262. For example, the NIC 220 may be configured to control the clock input 246 and/or 258 and the clock inputs 242, 254, 262, 246 and/or 258 may be gated (clock gating) to turn the clock signal OFF to the corresponding circuitry.

Figure 3:
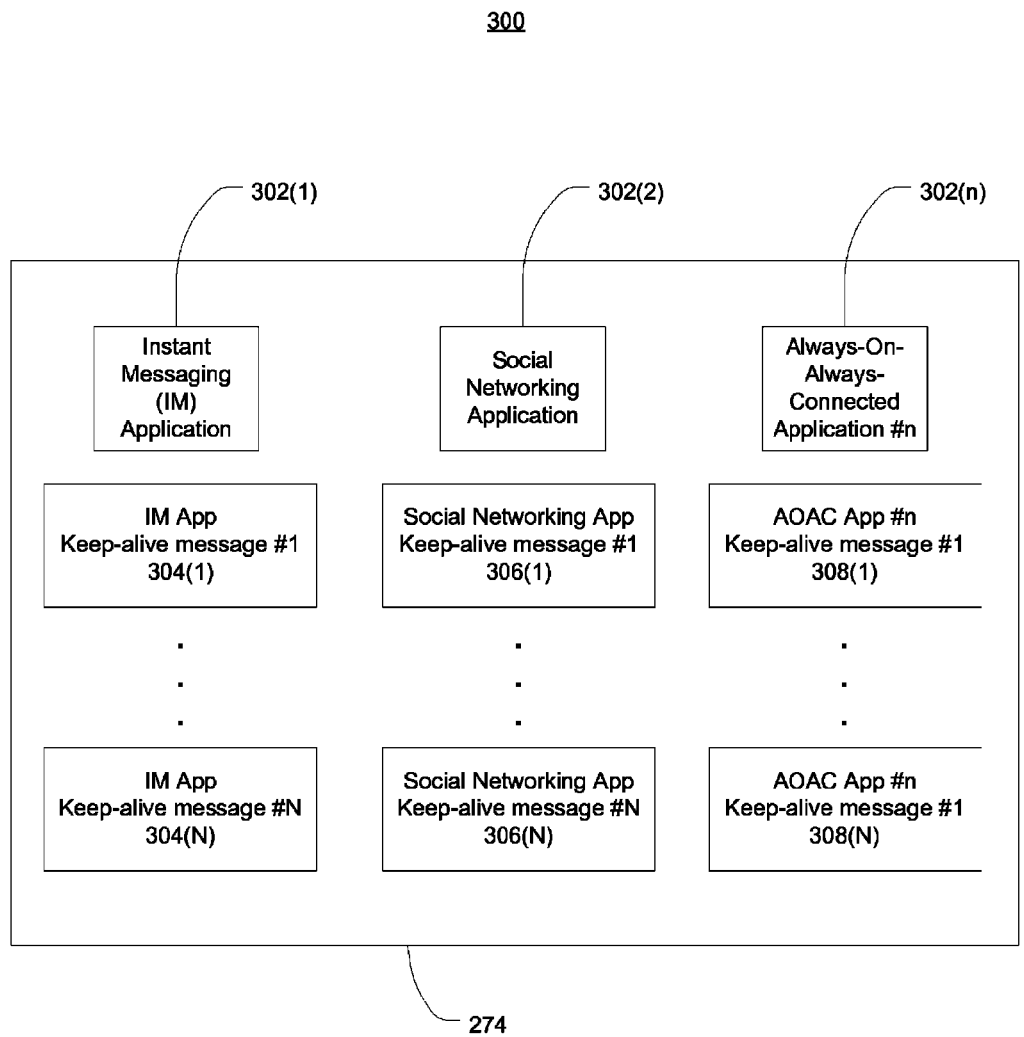
FIG. 3 depicts one embodiment of a list of keep-alive messages stored in memory consistent with the present disclosure.
Figure 4:
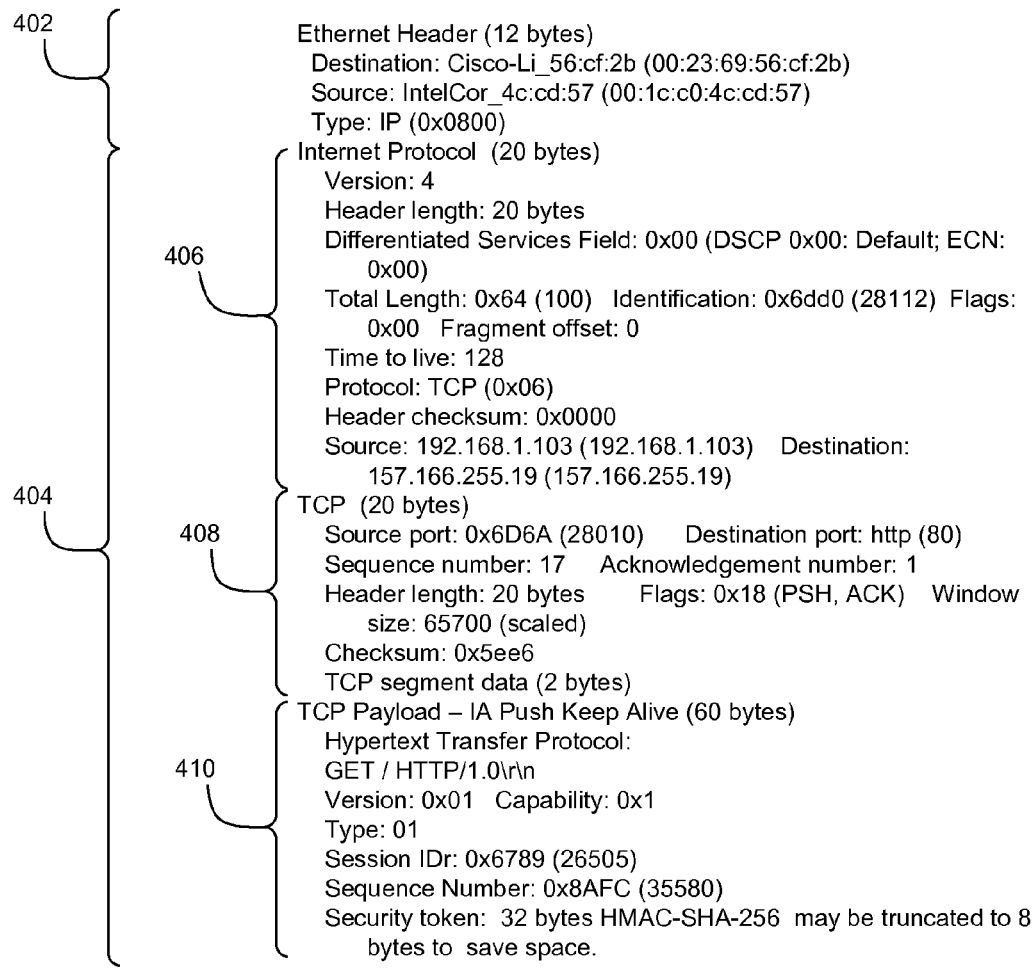
FIG. 4 depicts one embodiment of a keep-alive message packet consistent with the present disclosure.

One embodiment illustrating a list 300 of a plurality of keep-alive messages stored in memory 274 for a plurality of AOAC applications 302(1)-(n), is generally illustrated in FIG. 3. For example, AOAC applications 302(1)-(n) may include an instant messaging (IM) application 302(1) (such as, but not limited to, Microsoft Instant Messaging™, AOL Instant Messenger™, Mobile Instant Messaging (MIM), or the like), a social networking application 302(2) (such as, but not limited to, Facebook™, Twitter™, MySpace™, or the like), and/or any other AOAC application 302(n). Each AOAC application 302(1)-(n) may include a plurality of associated keep-alive messages 304(1)-(N), 306(1)-(N), and 308(1)-(N) based on a respective application/service proprietary protocol, sequence number, timing information, and/or application/service key or token. One embodiment of a keep-alive packet 400 consistent with the present disclosure is generally illustrated in FIG. 4. For example, the keep-alive packet 400 may comprise a header 402 and a payload 404 compatible with a TCP/IP based protocol. The header 402 may contain destination and source MAC addresses. The payload 404 may contain Internet Protocol header segment 406, a TCP segment 408, and a TCP payload segment 410 as generally illustrated.

Figure 5:
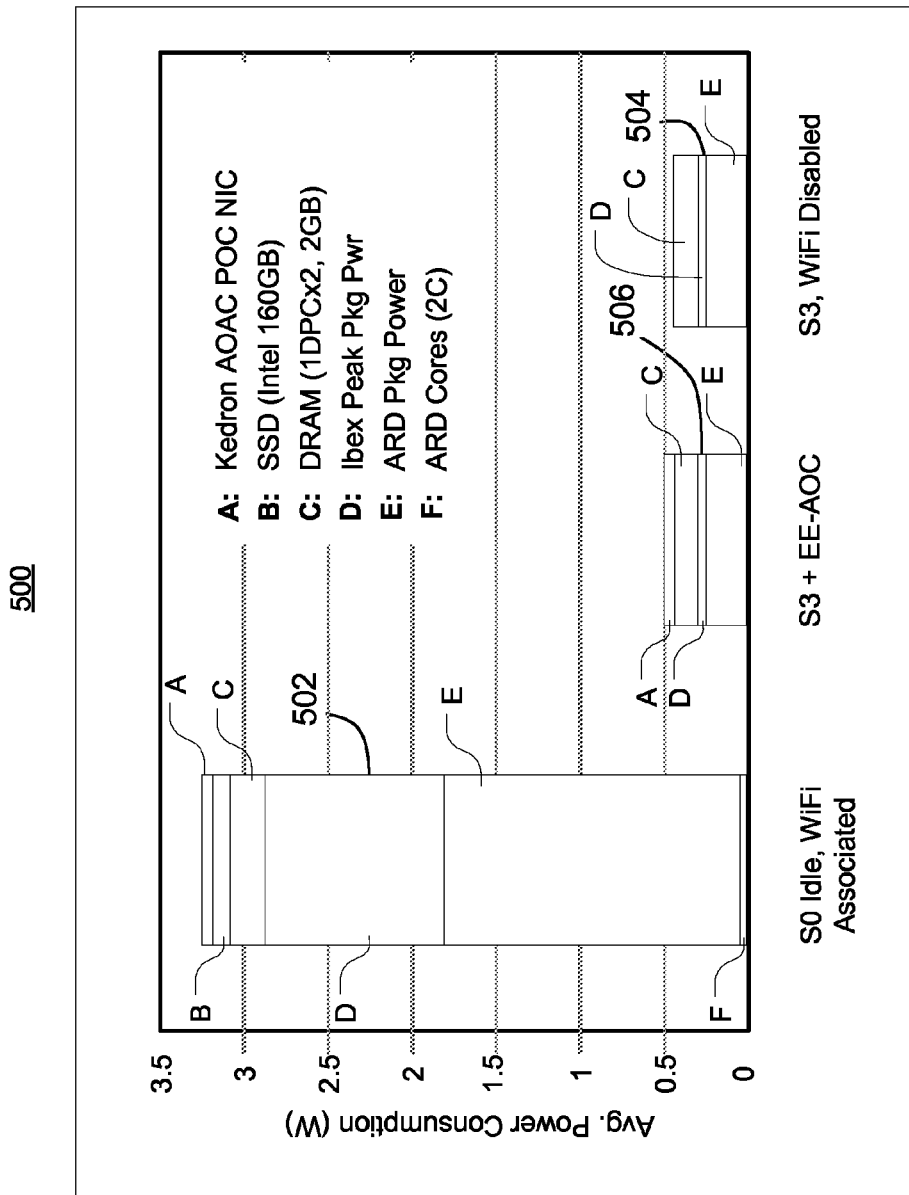
FIG. 5 depicts a power profile chart illustrating the average power consumption of a host system operating in various states.

Turning now to FIG. 5, a chart 500 is provided which illustrates one example of the average power consumption (W) of a client platform in various modes (e.g., modes 502, 504, and 506). As can be seen, the client platform and NIC (e.g., the NIC 220 in FIG. 2) consumes approximately 3.25 W while operating in the active-power state (e.g., S0 Idle) with WiFi active (502) and consumes approximately 0.4 W while in the low-power state (e.g., S3) with WiFi disabled (504). As may be appreciated, the S3 state (504) has the WiFi disabled and therefore cannot maintain network connectivity and/or presence. The S3 state (504) is believed to represent the minimum power that the NIC 220 can consume without the platform being shut down completely. In contrast, the NIC 220 operating in the low-power state (e.g., S3) utilizing the AOAC method of the present disclosure only consumes approximately 0.5 W (506). As such, the NIC 220 in the AOAC mode (506) of the present disclosure only consumes approximately 0.1 W more than the S3 mode (504), while still maintaining network connectivity and presence.

Figure 6:
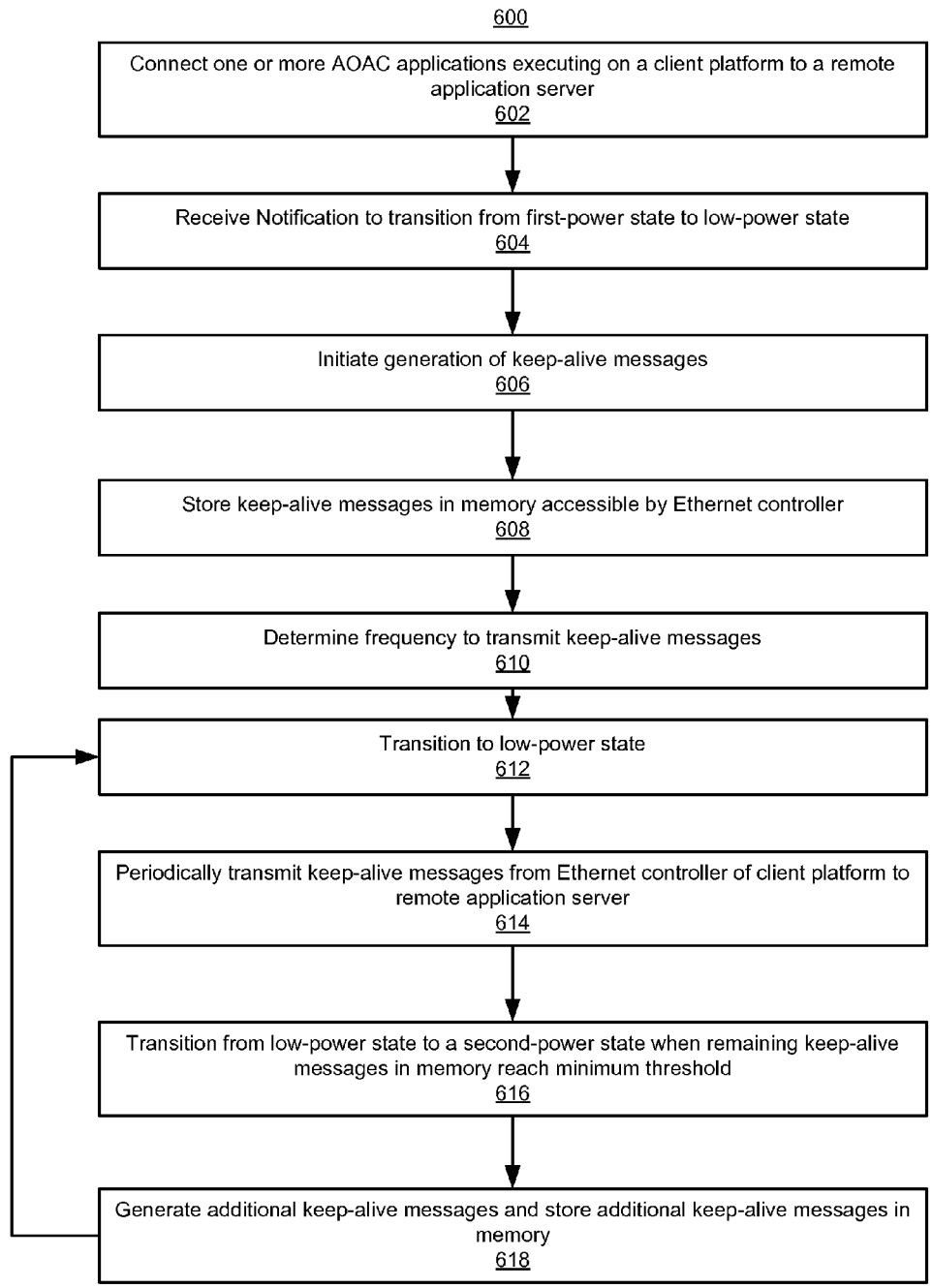
FIG. 6 illustrates one embodiment of a flowchart of operations consistent with the present disclosure.

Turning now to FIG. 6, one embodiment illustrating a flowchart 600 of operations to establish and/or maintain connectivity and presence with a remote application server is provided. For example, one or more AOAC applications executing on the client platform are connected to a remote application server (operation 602). The client platform is operating in a first-power state (e.g., an active-power state). The client platform then receives a notification to transition from the first-power state to a low-power state (operation 604). The notification may be user-generated (e.g., closing the lid on a laptop or activating a low-power state function) and/or automatic (e.g., the client platform may automatically transition to the low-power state after a predetermined period of inactivity). Prior to transitioning to the low-power state, the client platform initiates the generation of the keep-alive messages (operation 606). The keep-alive messages may be generated prior to, or after, notification to transition to the low-power state. As described herein, the entire keep-alive messages may be generated (e.g., the completely pre-built keep-alive messages) or a portion of the keep-alive messages may be generated (e.g., a general keep-alive message and a list of security tokens). The keep-alive messages (or portions thereof) may be stored in memory which is accessible to the NIC while the client platform is in the low-power state (operation 608). Optionally, the client platform determines the frequency to transmit the keep-alive messages, for example, when multiple AOAC applications are executing on the client platform (operation 610).

The client platform may then transition to the low-power state (operation 612). Once the client platform in operating in the low-power state, the NIC may begin periodically transmitting the keep-alive messages to the remote application server (operation 614). The NIC may continue to transmit the keep-alive messages until the client platform transition from the low-power state (e.g., due to a packet received by the NIC or a user-initiated transition). Alternatively, the NIC may continue to transmit the keep-alive messages until the remaining number of keep-alive messages stored in the memory reaches a minimum threshold. Once the minimum threshold has been reached, the client platform transitions from the low-power state to a second-power state (operation 616). The client platform then initiates generating additional keep-alive messages and stores them in the memory (operation 618). The second-power state may be the active-power state or an intermediary power state sufficient to allow the client platform to generate additional keep-alive messages. The minimum threshold may be selected to allow the client platform sufficient time to generate additional keep-alive messages while still maintaining connectivity and presence with the remote application server. After the additional keep-alive messages have been generated/stored, the client platform transitions back to the low-power state (operation 612) and resumes periodically transmitting the keep-alive messages as described herein.

Figure 7:
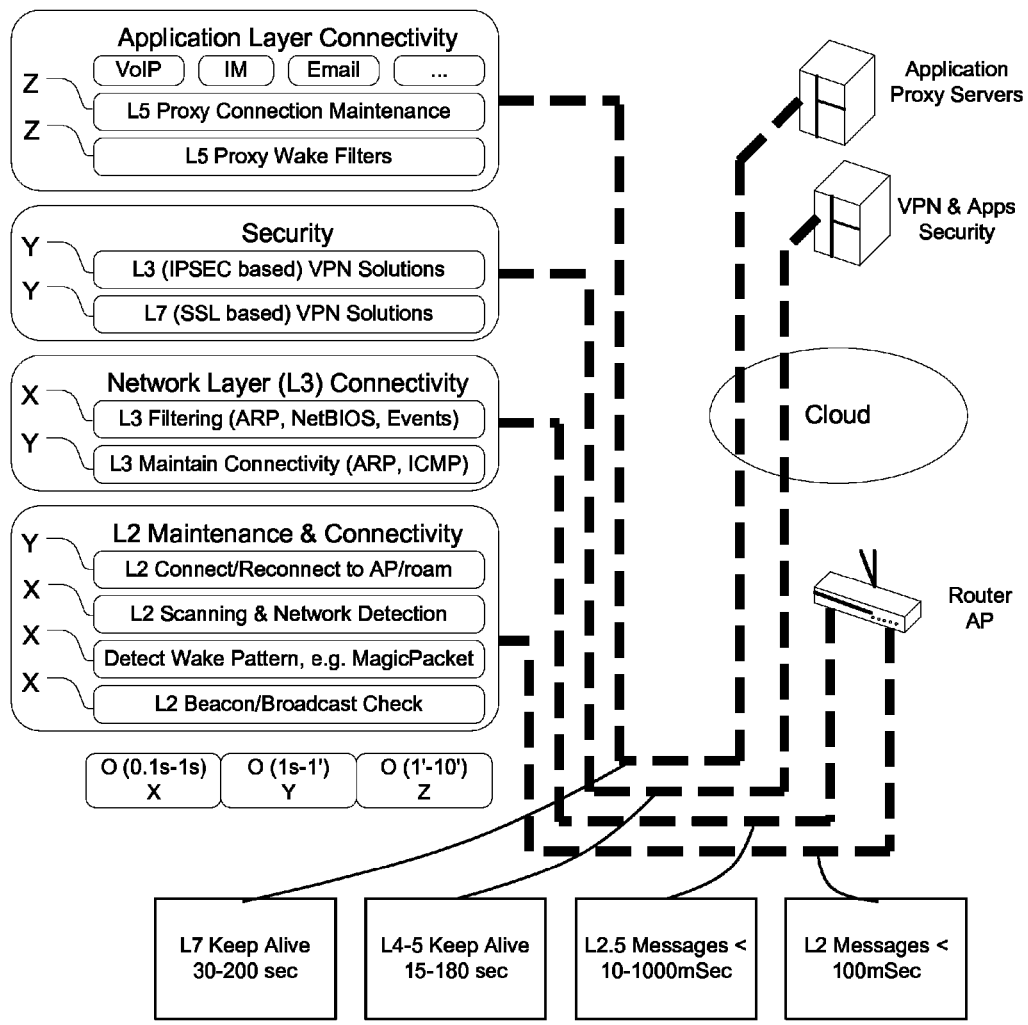
FIG. 7 illustrates one embodiment of the various stack layers.

As explained herein, the client platform 102, FIG. 1, may maintain connectivity and presence to the network 104 and one or more remote application servers 106 when the client platform 102 is in a low-power state by periodically transmitting keep-alive messages to the appropriate address (e.g., the application server 106). As discussed herein, the keep-alive messages may be generated based on a respective application/service proprietary protocol, sequence number, timing information, and/or application/service key or token. To operate in accordance with the protocols and/or standards described herein, the keep-alive messages may implement some of the communication system layers. FIG. 7 illustrates at a high level a keep-alive message 700 and its associated frequency of the various layers of a network stack. For example, the keep-alive message 700 consistent with at least one embodiment of the present disclosure may target the data/link layer message (such as, but not limited to, 802.11 MAC layer (i.e., OSI Data/Link Layer 2)) and applications/services layer messages (such as, but not limited to, OSI Session Layer 5, OSI Presentation layer 6, and OSI Application Layer 7)); however, it should be understood that a keep-alive message consistent with the present disclosure is also applicable to messages at any layer.

The Data/Link Layer 2 provides the functional and procedural means to transfer data between network entities and to detect and possibly correct errors that may occur in the Physical Layer. The Session Layer 5 controls the dialogues (connections) between computers. It establishes, manages and terminates the connections between the local and remote application. It provides for full-duplex, half-duplex, or simplex operation, and establishes checkpointing, adjournment, termination, and restart procedures. The Session Layer is commonly implemented explicitly in application environments that use remote procedure calls in which the client platform 102 sends a request message to a known remote application server 106 to execute a specified procedure with supplied parameters. The remote application server 106 sends a response to the client platform 102, and the application continues its process. The Presentation Layer 6 establishes context between Application Layer entities, in which the higher-layer entities may use different syntax and semantics if the presentation service provides a mapping between them. If a mapping is available, presentation service data units are encapsulated into session protocol data units, and passed down the stack. The Presentation Layer 6 provides independence from data representation (e.g., encryption) by translating between application and network formats. The Application Layer 7 interacts with software applications that implement a communicating component. Application Layer 7 functions may include identifying communication partners, determining resource availability, and synchronizing communication.

NIC 220 may also include I/O link or bus circuitry (not shown) to provide I/O communications between the NIC 220 and the chipset circuitry 206 (such link or bus circuitry may comply with the aforementioned PCI-Express communications protocol). NIC may also include MAC/PHY interface circuitry (not shown) configured to provide I/O communications between the MAC circuitry 220 and the PHY circuitry 224 (which may include, for example SGMII or XAUI).

Memory 208 and/or memory 274 associated with the NIC 220 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 208 and/or memory 274 associated with the NIC 220 may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The wireless and/or wired communications protocol (e.g., but not limited to, an Ethernet protocol), described herein, may be capable permitting communication using a Transmission Control Protocol/Internet Protocol (TCP/IP). The wireless and/or wired protocol may comply or be compatible with the Ethernet standard published by the Institute of Electrical and Electronics Engineers (IEEE) titled "IEEE 802.3 Standard", published in March, 2002 and/or later versions of this standard (such as, but not limited to, the "IEEE 802.11 Standard").

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 and/or 802.11 communications protocols, and/or PHY circuitry that is compliant with an after-developed communications protocol.

According to one aspect, the present disclosure features a method for maintaining communication between a host system and a remote application server after the host system transitions from a first power state to a low-power state. The method includes establishing a communication link between a host system executing an Always-On-Always-Connected (AOAC) application and a remote application server associated with the AOAC application. The method further includes receiving an indication to transition a host system from a first power state to a low-power state and initiating the generation of a plurality of keep-alive messages associated with the AOAC application. The method further includes transitioning the host system from the first power state to the low-power state. The method further includes periodically transmitting the keep-alive messages from circuitry to the remote application server while the host system is in the low-power state. The keep-alive messages may be configured to maintain connectivity and presence of the AOAC application with the remote application server while the host system is in the low-power state.

According to another aspect, the present disclosure features a system including a host system configured to operate in a first power state and a low-power state, circuitry, and memory. The host system is configured to execute at least one Always-On-Always-Connected (AOAC) application while in the first power state. The host system is further configured to initiate the generation of a set of one or more keep-alive messages associated with the AOAC application prior to transitioning to the low-power state. The circuitry is configured to establish a communication link between the host system and a remote application server associated with the AOAC application. The circuitry is further configured to periodically transmit one or more keep-alive messages to the remote application server upon the host system transitioning from the first power state to the low-power state. The keep-alive messages are configured to maintain connectivity and presence of the AOAC application with the remote application server while the host system is in the low-power state. The memory is configured to store the keep-alive messages. The memory is configured to be accessible to the circuitry while the host system remains in the low-power state.

According to yet another aspect, the present disclosure features an apparatus including circuitry configured to establish a communication link between a host system executing an Always-On-Always-Connected (AOAC) application in a first power state and a remote application server associated with the AOAC application. The circuitry is further configured to periodically transmit one or more keep-alive messages associated with the AOAC application to the remote application server upon the host system transitioning from the first power state to a low-power state. The keep-alive messages are configured to maintain connectivity and presence of the AOAC application with the remote application server while the host system is in the low-power state. The keep-alive messages are stored in memory accessible to the circuitry while the host system remains in the low-power state.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:
    establishing a plurality of communication links between a host system executing a plurality of Always-On-Always-Connected (AOAC) applications and respective remote application servers associated with each of said plurality of AOAC applications;
    receiving an indication to transition a host system from a first power state to a low-power state;
    initiating the generation of a plurality of keep-alive messages associated with each of said plurality of AOAC applications;
    comparing a minimum time (Tapp) for each of said plurality of AOAC applications to maintain connectivity and presence with said respective remote server to determine a smallest Tapp (Tmin) for all of said plurality of AOAC applications;
    transitioning said host system from said first power state to said low-power state; and
    periodically transmitting said keep-alive messages from circuitry to said remote application servers for each of said plurality AOAC applications at a rate based on Tmin while said host system is in said low-power state, said keep-alive messages configured to maintain connectivity and presence of said AOAC applications with said remote application servers while said host system is in said low-power state.

2. The method of claim 1, further comprising:
    storing at least a portion of said keep-alive messages in memory accessible to said circuitry while said host system remains in said low-power state.

3. The method of claim 1, further comprising:
    generating a general keep-alive message and a list of security tokens prior to said host system transitioning to said low-power state;
    recovering said general keep-alive message and said list of security tokens and assembling said general keep-alive message with a respective one of said security tokens from said list to generate said keep-alive message after said host system transitions to said low-power state.

4. The method of claim 1, further comprising:
    transitioning said host system from said low-power state to a second power state when a remaining number of keep-alive messages in said memory reaches a threshold; and
    generating additional keep-alive messages while in said second power state and transition back to said low-power state thereafter, and wherein said circuitry is further configured to transmit said additional keep-alive messages while said host system is in said low-power state, thereby maintaining connectivity and presence of said AOAC applications with said remote application servers while said host system is in said low-power state.

5. The method of claim 1, further comprising:
    transitioning said host system from said low-power state to a second power state based on a packet received from said remote application servers.

6. The method of claim 1, wherein said low-power state includes the S3 state as defined by the Advanced Configuration and Power Interface (ACPI) specification, and wherein first power state includes the S0 state as defined by the ACPI specification.

7. A system, comprising:
    a host system configured to operate in a first power state and a low-power state, said host system further configured to execute a plurality of Always-On-Always-Connected (AOAC) applications while in said first power state, said host system further configured to initiate the generation of a set of one or more keep-alive messages associated with said AOAC applications prior to transitioning to said low-power state;
    circuitry configured to compare a minimum time (Tapp) for each of said plurality of AOAC applications to maintain connectivity and presence with said respective remote server to determine a smallest Tapp (Tmin) for all of said plurality of AOAC applications;
    circuitry configured to establish communication links between said host system and respective remote application servers associated with said AOAC applications, said circuitry further configured to periodically transmit said one or more keep-alive messages to said remote application servers for each of said plurality of AOAC applications at a rate based on Tmin upon said host system transitioning from said first power state to said low-power state, said keep-alive messages configured to maintain connectivity and presence of said AOAC applications with said remote application servers while said host system is in said low-power state; and
    memory configured to store said one or more keep-alive messages, said memory configured to be accessible to said circuitry while said host system remains in said low-power state.

8. The system of claim 7, wherein said host system is configured to initiate the generation of a set of one more keep-alive messages associated with said AOAC applications upon activation of at least one of a function key and a predefined timeout period.

9. The system of claim 7, wherein low-power state includes the S3 state as defined by the Advanced Configuration and Power Interface (ACPI) specification, and wherein first power state includes the S0 state as defined by the ACPI specification.

10. The system of claim 7, wherein said circuitry includes media access control (MAC) circuitry comprising transmit MAC circuitry and physical interface (PHY) circuitry comprising transmit circuitry, wherein said transmit MAC circuitry is configured to receive an AOAC command from a device driver operating on said host system, and, in response to said AOAC command, said transmit MAC circuitry and at least said transmit circuitry are configured to periodically transmit keep-alive messages stored in said memory to said remote application servers while said host remains in said low-power state.

11. The system of claim 7, wherein said circuitry is further configured to transition said host system from said low-power state to a second power state when a remaining number of keep-alive messages in said memory reaches a threshold;

wherein said host system is further configured to generate additional keep-alive messages while in said second power state and transition back to said low-power state thereafter, and wherein said circuitry is further configured to transmit said additional keep-alive messages while said host system is in said low-power state, thereby maintaining connectivity and presence of said AOAC applications with said remote application servers while said host system is in said low-power state.

12. The system of claim 7, wherein said host system is configured to generate a list of pre-built keep-alive messages prior to said host system transitioning to said low-power state.

13. The system of claim 7, wherein said host system generates a general keep-alive message and a list of security tokens prior to said host system transitioning to said low-power state, and wherein said circuitry is further configured to recover said general keep-alive message and said list of security tokens, and assemble said general keep-alive message with a respective one of said security tokens from said list to generate a keep-alive message for transmission to said remote application servers at the appropriate time.

14. The system of claim 7, wherein said circuitry is configured to transition said host system from said low-power state to a second power state based on a packet received from said remote application servers.

15. An apparatus, comprising:
circuitry configured to establish a plurality of communication links between a host system executing a plurality of Always-On-Always-Connected (AOAC) applications in a first power state and respective remote application servers associated with said AOAC applications, said circuitry further configured to compare a minimum time (Tapp) for each of said plurality of AOAC applications to maintain connectivity and presence with said respective remote server to determine a smallest Tapp (Tmin) for all of said plurality of AOAC applications, wherein said circuitry also periodically transmits one or more keep-alive messages associated with said AOAC applications to said remote application servers for each of said plurality of AOAC applications at a rate based on Tmin upon said host system transitioning from said first power state to a low-power state, said keep-alive messages configured to maintain connectivity and presence of said AOAC applications with said remote application servers while said host system is in said low-power state;

wherein said keep-alive messages are stored in memory accessible to said circuitry while said host system remains in said low-power state.

16. The apparatus of claim 15, wherein said host system host system initiates generation of said one or more keep-alive messages associated with said AOAC applications prior to transitioning to said low-power state.

17. The apparatus of claim 15, wherein low-power state includes the S3 state as defined by the Advanced Configuration and Power Interface (ACPI) specification, and wherein first power state includes the S0 state as defined by the ACPI specification.

18. The apparatus of claim 15, wherein said circuitry includes media access control (MAC) circuitry comprising transmit MAC circuitry and physical interface (PHY) circuitry comprising transmit circuitry, wherein said transmit MAC circuitry is configured to receive an AOAC command from a device driver operating on said host system, and, in response to said AOAC command, said transmit MAC circuitry and at least said transmit circuitry are configured to periodically transmit keep-alive messages stored in said memory to said remote application servers while said host remains in said low-power state.

19. The apparatus of claim 15, wherein said circuitry is configured to transition said host system from said low-power state to a second power state when a remaining number of keep-alive messages in said memory reaches a threshold;
wherein circuitry is further configured to initiate the generating of additional keep-alive messages while said host system is operating in said second power state; and
wherein said circuitry is further configured to transmit said additional keep-alive messages after said host system transitions back to said low-power state, thereby maintaining connectivity and presence of said AOAC applications with said remote applications server while said host system is in said low-power state.

20. The apparatus of claim 15, wherein said circuitry is configured to recover a general keep-alive message and said list of security tokens from said host system and assemble said general keep-alive message with a respective one of said security tokens from said list to generate a keep-alive message for transmission to said remote application servers at the appropriate time.

* * * * *